(12) United States Patent
Zhang et al.

(10) Patent No.: US 11,836,996 B2
(45) Date of Patent: Dec. 5, 2023

(54) METHOD AND APPARATUS FOR RECOGNIZING TEXT

(71) Applicant: BEIJING BAIDU NETCOM SCIENCE AND TECHNOLOGY CO., LTD., Beijing (CN)

(72) Inventors: Xiaoqiang Zhang, Beijing (CN); Pengyuan Lv, Beijing (CN); Shanshan Liu, Beijing (CN); Chengquan Zhang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 492 days.

(21) Appl. No.: 17/209,987

(22) Filed: Mar. 23, 2021

(65) Prior Publication Data

US 2021/0224568 A1     Jul. 22, 2021

(30) Foreign Application Priority Data

Jul. 24, 2020   (CN) .......................... 202010721524.5

(51) Int. Cl.
*G06V 10/70* (2022.01)
*G06F 40/10* (2020.01)
(Continued)

(52) U.S. Cl.
CPC .......... *G06V 20/62* (2022.01); *G06F 18/2178* (2023.01); *G06F 40/205* (2020.01);
(Continued)

(58) Field of Classification Search
USPC .......................... 382/100–105, 113, 154–308
See application file for complete search history.

(56) References Cited

U.S. PATENT DOCUMENTS 10,671,878 B1    6/2020  Sarshogh et al.
11,562,591 B2 *  1/2023  Nguyen ........... G06V 30/19173
(Continued)

FOREIGN PATENT DOCUMENTS

CN    108549893 A    9/2018
CN    109117846 A    1/2019
(Continued)

OTHER PUBLICATIONS

Ey Liu L., Topic-oriented Network Chinese Text Data Detecting and Tracking Method, Involves Judging Whether Current Document Determined as Current Topic or Specific Topic Corresponding to Probability Distribution of Topic; Feb. 9, 2018 (Year: 2018).*
(Continued)

*Primary Examiner* — Marcellus J Augustin
(74) *Attorney, Agent, or Firm* — Kilpatrick Townsend & Stockton LLP

(57) ABSTRACT

The present disclosure discloses a method and apparatus for recognizing a text. The method comprises: acquiring images of a text area of an input image, the acquired images including a text centerline graph, a text direction offset graph, a text boundary offset graph, and a text character classification graph; extracting coordinates of feature points of a character center from the text centerline graph; sorting the extracted coordinates of the feature points based on the text direction offset graph to obtain a coordinate sequence of the feature points; determining a polygonal bounding box of the text area based on the coordinate sequence of the feature points of the character center and the text boundary offset graph; and determining a classification result of the feature points of the character center, based on the coordinate sequence of the feature points of the character center and the text character classification graph.

20 Claims, 7 Drawing Sheets

(51) Int. Cl.
  *G06F 18/20* (2023.01)
  *G06F 18/213* (2023.01)
  *G06V 20/62* (2022.01)
  *G06F 40/284* (2020.01)
  *G06F 40/205* (2020.01)
  *G06V 30/148* (2022.01)
  *G06F 18/21* (2023.01)
  *G06V 30/262* (2022.01)
  *G06V 10/764* (2022.01)
  *G06V 10/82* (2022.01)
  *G06V 30/10* (2022.01)

(52) U.S. Cl.
  CPC .......... *G06F 40/284* (2020.01); *G06V 10/764* (2022.01); *G06V 10/82* (2022.01); *G06V 20/63* (2022.01); *G06V 30/153* (2022.01); *G06V 30/274* (2022.01); *G06V 30/10* (2022.01)

(56) References Cited

U.S. PATENT DOCUMENTS

| | | | | |
|---|---|---|---|---|
| 2007/0172125 | A1* | 7/2007 | Walch | G06V 30/32 382/229 |
| 2019/0220660 | A1* | 7/2019 | Cali | G06V 30/40 |
| 2019/0272438 | A1* | 9/2019 | Liu | G06N 3/045 |
| 2020/0134571 | A1 | 4/2020 | Demick et al. | |
| 2020/0401829 | A1* | 12/2020 | Xin | G06V 30/19153 |
| 2021/0232847 | A1* | 7/2021 | Yue | G06V 20/56 |

FOREIGN PATENT DOCUMENTS

| | | |
|---|---|---|
| CN | 111160352 A | 5/2020 |
| JP | H08-161421 A | 6/1996 |
| JP | 2006-73000 A | 3/2006 |

OTHER PUBLICATIONS

Zhang, Cheng-quan, Character Detecting Method, Device and Terminal; Oct. 8, 2019 (Year: 2019).*

Wang, Min; A Natural Scene Curve Text Detection Method; Mar. 27, 2020 (Year: 2020).*

Liu, Hao; A Text Detection Method, Device and Identification System; Apr. 17, 2020 (Year: 2020).*

"A Sequence Text Recognition Method," Industrial Control Computer, vol. 31, Issue 5, 2018, China Academic Journal Electronic Publishing House; http://www.cnki.net, pp. 93-96 (May 31, 2018).

Wang, Penfei et al., "A Single-Shot Arbitrarily-Shaped Text Detector based on Context Attended Multi-Task Learning," Multimedia, ACM, 2 Penn Plaza, Suite 701, New York, NY 10121-0701, USA, pp. 1277-1285, (Oct. 15, 2019).

Shangbang, Long et al., "Scene Text Detection and Recognition: The Deep Learning Era," ARXIV.org, Cornell University Library, 201 Olin Library Cornell Univeristy Ithaca, NY 14853, pp. 1-20, (Nov. 10, 2018).

European Search Report dated Sep. 13, 2021 of the corresponding European Patent Application No. 21164053.7 (seven pages).

* cited by examiner

METHOD AND APPARATUS FOR RECOGNIZING TEXT

CROSS-REFERENCE TO RELATED APPLICATIONS

This application claims priority to Chinese Patent Application No. 202010721524.5, filed with the China National Intellectual Property Administration (CNIPA) on Jul. 24, 2020, the contents of which are incorporated herein by reference in their entirety.

TECHNICAL FIELD

The present disclosure relates to the field of computer technology, in particular to the fields of artificial intelligence technology, computer vision technology, knowledge graph technology, and natural language processing technology, and more particular to a method and apparatus for recognizing a text.

BACKGROUND

End-to-end text detection and recognition technology in natural scenarios may be widely used in all walks of life in society, such as education, medical care, or finance. Technologies such as recognition of common card bills, automatic document entry, photo search for topic or AR real-time translation, which have been derived from the text detection and recognition technology, greatly improve the intelligence and production efficiency of these traditional industries, and facilitates people's daily study and life.

In recent years, the end-to-end text detection and recognition technology in natural scenarios develops rapidly. Many companies and researchers adopt a two-stage solution of detection and recognition or a character-based method to realize end-to-end detection and recognition.

In the two-stage solution that treats detection and recognition issues as sub-issuers and process separately, text detection aims to determine the position of a text in an image. The conventional methods generally comprise efficient and accurate scenario text detection (East). Text recognition is a multi-classification task that aims to determine the content of a text in the image. Commonly used methods comprise connectionist temporal classification (CTC) and Attention. The two-stage end-to-end solution shares convolutional features and combines text detection and recognition methods to become a system to achieve end-to-end output of detection and recognition results. Detection and recognition steps generally need to be connected by operations such as NMS or region of interest feature extraction.

In the character-based method, detection and recognition issues are usually considered together. A single-stage multi-branch structure is used to use a convolutional network to output text detection and recognition results in parallel. This method requires character-level labeling and a large backbone network, which may not run in real time.

SUMMARY

Embodiments of the present disclosure provide a method and apparatus for recognizing a text.

In a first aspect, embodiments of the present disclosure provide a method for recognizing a text, comprising: acquiring images of a text area of an input image, the acquired images including: a text centerline graph, a text direction offset graph, a text boundary offset graph, and a text character classification graph; extracting coordinates of feature points of a character center from the text centerline graph; sorting the extracted coordinates of the feature points of the character center based on the text direction offset graph to obtain a coordinate sequence of the feature points of the character center; determining a polygonal bounding box of the text area based on the coordinate sequence of the feature points of the character center and the text boundary offset graph; and determining a classification result of the feature points of the character center, based on the coordinate sequence of the feature points of the character center and the text character classification graph.

In a second aspect, embodiments of the present disclosure provide an apparatus for recognizing a text, comprising: an image acquisition module, configured to acquire images of a text area of an input image, the acquired images including a text centerline graph, a text direction offset graph, a text boundary offset graph, and a text character classification graph; a coordinate acquisition module, configured to extract coordinates of a feature points of a character center from the text centerline graph; a coordinate sorting module, configured to sort the coordinates of the feature points of the character center based on the text direction offset graph to obtain a coordinate sequence of the feature points of the character center; a boundary determination module, configured to determine a polygonal bounding box of the text area based on the coordinate sequence of the feature points of the character center and the text boundary offset graph; and a classification determination module, configured to determine a classification result of the feature points of the character center, based on the coordinate sequence of the feature points of the character center and the text character classification graph.

In a third aspect, embodiments of the present disclosure provide an electronic device, comprising: one or more processors; and a storage apparatus, storing one or more programs thereon, wherein the one or more programs, when executed by the one or more processors, cause the one or more processors to implement the method provided by the first aspect.

In a forth aspect, embodiments of the present disclosure provide a computer-readable medium, storing a computer program thereon, wherein the program, when executed by a processor, causes the processor to implement the method provided by the first aspect.

The method and apparatus for recognizing a text provided by the embodiments of the present disclosure, first acquire the images of the text area of the input image, the acquired images including the text centerline graph, the text direction offset graph, the text boundary offset graph, and the text character classification graph; then extract the coordinates of the feature points of the character center from the text centerline graph; sort the coordinates of the feature points of the character center based on the text direction offset graph to obtain the coordinate sequence of the feature points of the character center; determine the polygonal bounding box of the text area based on the coordinate sequence of the feature points of the character center and the text boundary offset graph; and finally determine the classification result of the feature points of the character center, based on the coordinate sequence of the feature points of the character center and the text character classification graph.

In this process, coordinates of a key point of an extracted character is determined using the text centerline graph, then based on the coordinates of the key point of the character and the text direction offset graph, a coordinate sequence of the key point of the character is obtained, and then based on the coordinate sequence, the polygonal bounding box of the text area and the classification result of the feature points of the character center are determined from the text boundary offset graph and the text character classification graph, thereby obtaining a recognition result of the text. Since the coordinates of the key point of the character and the text direction offset are used for recognition, text in any direction in the input image may be recognized, which improves the efficiency and accuracy of text recognition.

It should be understood that the content described in this section is not intended to identify key or important features of the embodiments of the present disclosure, nor is intended to limit the scope of the present disclosure. Other features of the present disclosure will be easily understood by the following description.

BRIEF DESCRIPTION OF THE DRAWINGS

The accompanying drawings are used to better understand the present solution and do not constitute a limitation to the present disclosure, in which:

By reading the detailed description of non-limiting embodiments with reference to the following accompanying drawings, other features, objectives and advantages of the present disclosure will become more apparent:

FIG. 4b is an example application scenario of the method for recognizing a text according to the embodiment of the present disclosure in FIG. 4a;

DETAILED DESCRIPTION OF EMBODIMENTS

The following describes exemplary embodiments of the present disclosure in conjunction with the accompanying drawings, which comprises various details of the embodiments of the present disclosure to facilitate understanding, and they should be considered as merely exemplary. Therefore, those of ordinary skill in the art should recognize that various changes and modifications may be made to the embodiments described herein without departing from the scope and spirit of the present disclosure. Also, for clarity and conciseness, descriptions of well-known functions and structures are omitted in the following description.

It should be noted that the embodiments in the present disclosure and the features in the embodiments may be combined with each other on a non-conflict basis. Hereinafter, the present disclosure will be described in detail with reference to the accompanying drawings and in conjunction with the embodiments.

Figure 1:
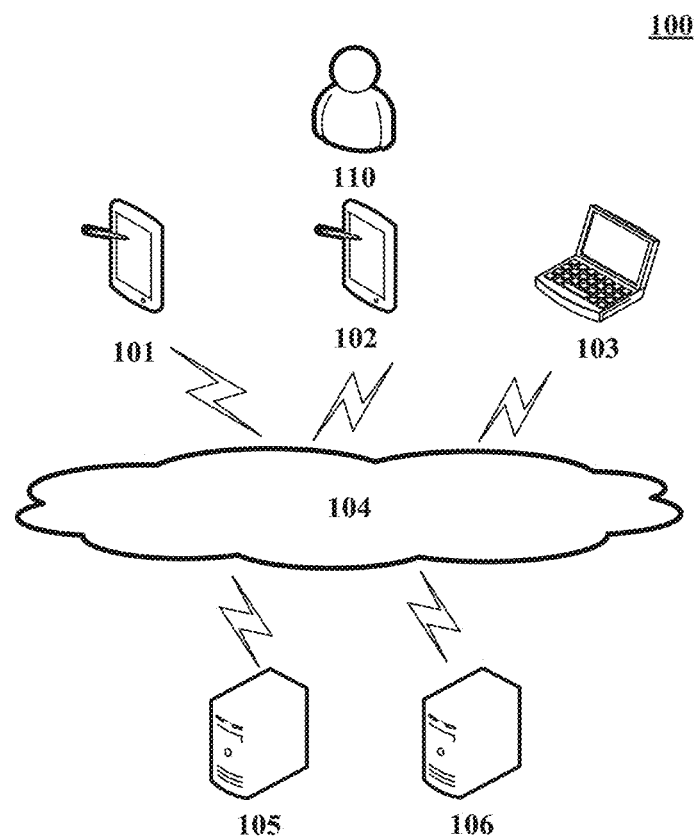
FIG. 1 is a diagram of an exemplary system architecture in which the present disclosure may be implemented.

FIG. 1 illustrates an exemplary system architecture 100 of an embodiment of a method for recognizing a text or an apparatus for recognizing a text in which the present disclosure may be implemented.

As shown in FIG. 1, the exemplary system architecture 100 may comprise terminal devices 101, 102, and 103, a network 104, and a server 105. The network 104 is used to provide a communication link medium between the terminal devices 101, 102, and 103 and the server 105. The network 104 may comprise various types of connections, such as wired, wireless communication links, or optic fibers.

A user may use the terminal devices 101, 102, and 103 to interact with the server 105 through the network 104 to receive or send messages, etc. Various communication client applications, such as image acquisition applications, audio playback applications, stream media processing applications, multi-party interaction applications, artificial intelligence applications, or game applications, may be installed on the terminal devices 101, 102, and 103.

The terminal devices 101, 102, and 103 may be hardware or software. When the terminal devices 101, 102, and 103 are hardware, they may be various electronic devices supporting document processing applications, comprising but not limited to smart terminals, tablet computers, laptop portable computers, desktop computers, etc. When the terminal devices 101, 102, and 103 are software, they may be installed in the electronic devices listed above. The terminal devices 101, 102, and 103 may be implemented as a plurality of software or software modules (for example, for providing distributed services), or as a single software or software module, which is not limited herein.

The server 105 may be a server that provides various services, such as a backend server that provides support for the terminal devices 101, 102, and 103. The backend server may process such as analyze a received request and other data, and feed back a processing result to the terminal devices.

It should be noted that the server may be hardware or software. When the server is hardware, it may be implemented as a distributed server cluster composed of a plurality of servers, or as a single server. When the server is software, it may be implemented as a plurality of software or software modules (for example, for providing distributed services) or as a single software or software module, which is not limited herein.

In practice, the method for recognizing a text provided by the embodiments of the present disclosure may be performed by the terminal devices 101, 102, and 103, and/or may be performed by the server 105. Correspondingly, the apparatus for recognizing a text may be provided in the terminal devices 101, 102, and 103, and/or may be provided in the server 105.

It should be understood that the number of terminal devices, networks and servers in FIG. 1 is merely illustrative. Depending on the implementation needs, there may be any number of terminal devices, networks and servers.

Figure 2:
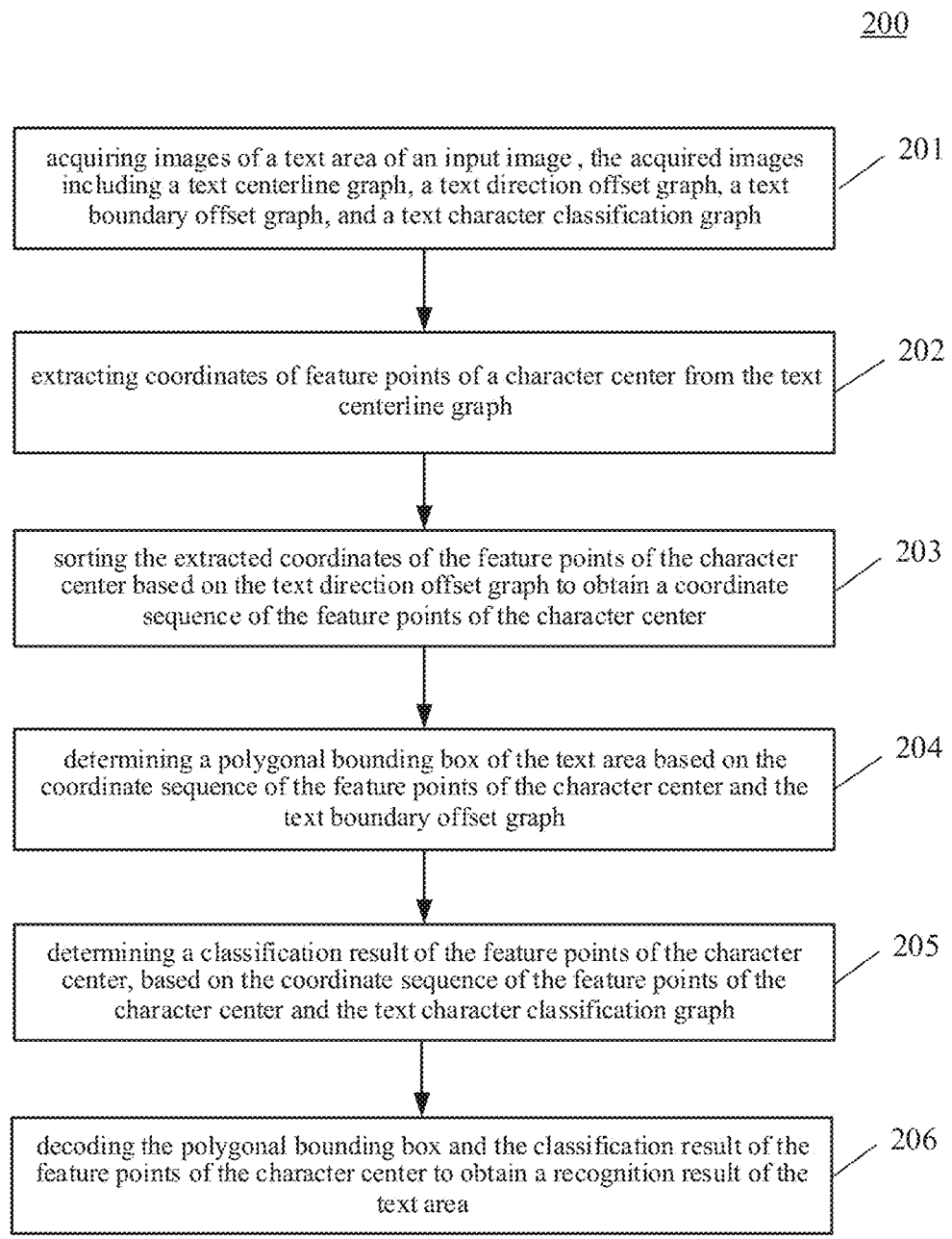
FIG. 2 is a schematic flowchart of an embodiment of a method for recognizing a text according to an embodiment of the present disclosure.

With reference to FIG. 2, a flow 200 of an embodiment of a method for recognizing a text according to the present disclosure is illustrated. The method for recognizing a text comprises the following steps:

Step 201, acquiring images of a text area of an input image, the acquired images including a text centerline graph, a text direction offset graph, a text boundary offset graph, and a text character classification graph.

In the present embodiment, an executing body of the method for recognizing a text (for example, the terminal or server shown in FIG. 1) may acquire the input image from a user's terminal, a local database or a remote database. Then, methods for determining a text centerline, a text direction offset, a text boundary offset, and a text character classification in the existing technology or technologies developed in the future may be used to determine the text centerline graph, the text direction offset graph, the text boundary offset graph, and the text character classification graph of the text area, respectively, which is not limited in the present disclosure.

In a method for determining a text centerline, the text centerline is a single-channel segmentation graph after zooming the text area, and is used to predict whether each pixel belongs to text or non-text. For example, a method based on topology refinement, a method based on distance transformation, a method based on tracking, etc. may be used to determine the text centerline. It may be understood that a manual calibration method may also be used to determine the text centerline.

The method based on topology refinement is used as an example, where a morphological corrosion operation may be used to continuously remove the boundary of an object until only its skeleton remains. The method based on distance transformation is used as another example, where the centerline of an object is determined by locating a set of points farthest from the boundary of the object. Euclidean distance is usually used, which may be understood as the centers of a series of largest inscribed spheres constituting the centerline of the object, and representative ones are distance transformation based on boundary and distance transformation based on source point.

In a method for determining a text direction offset, two-channel detection may be used to detect a plurality of positions of the center point of the text in the image, so as to determine and indicate a coordinate offset of a point on the center line of the text relative to a next point in a text reading direction.

In a method for determining a text boundary offset, four-channel detection may be used to detect a plurality of positions of the center point of the text in the image, positions of points on the upper and lower borders of the text, so as to determine and indicate a coordinate offset of the points on the upper and lower borders of the text relative to the points on the center line.

In a method for determining a text character classification graph, (C+1) channel detection may be used, where C is the number of text types to be recognized, 1 is the number of background types, and a feature graph of each channel represents a probability that the point belongs to a certain text category.

S202, extracting coordinates of feature points of a character center from the text centerline graph.

In the present embodiment, the executing body may extract the coordinates of the feature points of the character center from the text centerline graph using a method for extracting coordinates of feature points in the existing technology or technologies developed in the future, which is not limited in the present disclosure.

Step 203, sorting the extracted coordinates of the feature points of the character center based on the text direction offset graph to obtain a coordinate sequence of the feature points of the character center.

In the present embodiment, the executing body may sort the coordinates of the feature points of the character center, based on a preset reading direction, a selected reading direction or a predicted reading direction of the text direction offset graph, thereby obtained the sorted coordinates of the feature points of the character center, that is, obtaining the coordinate sequence of the feature points of the character center.

In some alternative implementations of the present embodiment, the sorting the extracted coordinates of the feature points of the character center based on the text direction offset graph to obtain a coordinate sequence of the feature points of the character center, may comprise: calculating a text reading direction based on the text direction offset graph; and sorting the extracted coordinates of the feature points of the character center based on the text reading direction, to obtain the coordinate sequence of the feature points of the character center.

In this implementation, since the text direction offset graph shows a coordinate offset of a point on the center line relative to a next point in the text reading direction (the coordinate offset may be obtained by subtracting coordinates of the next point from coordinates of a current point), based on the text direction offset in the text direction offset graph (that is, the above coordinate offset), the coordinate offset of each point on the center line may be averaged to calculate to obtain an average text reading direction. Then, based on the text reading direction, the coordinates of the feature points of the character center are sorted to obtain the sorted coordinates of the feature points of the character center, that is, the coordinate sequence of the feature points of the character center. The method for determining the coordinate sequence may calculate the reading direction of the text area facing in any direction, which improves the adaptability to the text area of different reading directions in the input image.

Step 204, determining a polygonal bounding box of the text area based on the coordinate sequence of the feature points of the character center and the text boundary offset graph.

In the present embodiment, the executing body may obtain positions of a pair of points on the upper and lower borders based on the coordinate sequence of the feature points of the character center from the text boundary offset graph, and then connect positions of all the points on the upper and lower borders to obtain an arbitrary shape polygonal bounding box of the text area.

Step 205, determining a classification result of the feature points of the character center, based on the coordinate sequence of the feature points of the character center and the text character classification graph.

In the present embodiment, the executing body may perform point collection in the text character classification graph based on the coordinate sequence of the feature points of the character center, so as to determine a character classification category to which the feature points of the character center belongs, that is, obtain the classification result of the feature points of the character center.

Alternative step 206, decoding the polygonal bounding box and the classification result of the feature points of the character center to obtain a recognition result of the text area.

In this alternative step, the executing body may decode a recognition result of each character in the text area, based on the polygonal bounding box and the classification result of the feature points of the character center. When decoding, decoding methods in the existing technology or technologies developed in the future may be used to obtain the recognition result of each character, which is not limited in the present disclosure. Through this decoding step, an efficient and accurate recognition result of text in any direction in the input image may be obtained.

In an example, connectionist temporal classification (CTC) decoding may be used. CTC may generalize connection characteristics between characters, and search for a path having the greatest probability of a given input, and it is more likely to find a path that maps to a correct result. In addition, prefix bundle search considers a "many-to-one" situation, which further increases the possibility of decoding the correct result.

In the method for recognizing a text of the above embodiment of the present disclosure, since the coordinates of the feature points of the character center are extracted using the text centerline graph, then based on the coordinates of the feature points of the character center and the text direction offset graph, the coordinate sequence of the feature points of the character center is obtained, and then based on the coordinate sequence, the polygonal bounding box of the text area and the classification result of the feature points of the character center are determined from the text boundary offset graph and the text character classification graph, thereby obtaining a recognition result of the text. Since the coordinates of the feature points of the character center and the text direction offset are used for recognition, text in any direction in the input image may be recognized, which improves the efficiency and accuracy of text recognition.

In some alternative implementations of step 201 in the foregoing embodiment, the acquiring images of a text area of an input image, the acquired images including a text centerline graph, a text direction offset graph, a text boundary offset graph, and a text character classification graph, comprises: acquiring a convolution feature graph of the input image using a backbone convolutional network; and extracting the text centerline graph, the text direction offset graph, the text boundary offset graph, and the text character classification graph from the convolution feature graph respectively using a multi-branch convolutional network.

In this implementation, when acquiring the text centerline graph, the text direction offset graph, the text boundary offset graph, and the text character classification graph of the text area of the input image, it is necessary to extract a feature in the input image. Therefore, a backbone network for extracting convolutional features may be used to extract features uniformly. Then, a parallel multi-branch convolutional network may be used to output the text centerline graph, the text direction offset graph, the text boundary offset graph, and the text character classification graph.

Here, the backbone network may use a network for extracting convolutional features in the existing technology or technologies developed in the future, which is not limited in the present disclosure. For example, a lightweight backbone network may be used to extract convolution features, such as a new-type convolutional network efficientnet, a lightweight convolutional neural network mobilenet or shufflenet, etc.

In some examples, a multi-task learning module based on a full convolutional network may be used to acquire the text centerline graph, the text direction offset graph, the text boundary offset graph, and the text character classification graph of the text area in the input image.

In some other examples, the multi-branch convolutional network may use methods in the existing technology or technologies developed in the future that may extract the text centerline graph, the text direction offset graph, the text boundary offset graph, and the text character classification graph from the convolution feature graph respectively, which is not limited in the present disclosure.

In this implementation, by cooperation of the backbone network and the multi-branch convolutional network, the acquiring images of a text area of an input image, the acquired images including a text centerline graph, a text direction offset graph, a text boundary offset graph, and a text character classification graph, is realized. Since the multi-branch convolutional network shares the backbone network, the multi-branch outputs in parallel, which may simplify the calculation process of the network and improve the calculation efficiency of the network.

In some alternative implementations of the present embodiment, the multi-branch convolutional network may comprise at least one of: supervising and learning a first branch convolutional network based on a Dice coefficient loss function, wherein the convolution feature graph and the text centerline graph are an input to the first branch convolutional network and an output from the first branch convolutional network, respectively; supervising and learning a second branch convolutional network based on a smooth L1 loss function, wherein the convolution feature graph and the text boundary offset graph are an input to the second branch convolutional network and an output from the second branch convolutional network, respectively; supervising and learning a third branch convolutional network based on the smooth L1 loss function, wherein the convolution feature graph and the text direction offset graph are an input to the third branch convolutional network and an output from the third branch convolutional network, respectively; and supervising and learning a fourth branch convolutional network based on a point collection-connectionist temporal classification loss function, wherein the convolution feature graph and the text character classification graph are an input to the fourth branch convolutional network and an output from the fourth branch convolutional network, respectively.

For the multi-branch convolutional network in this implementation, the first branch convolutional network is used to output the text centerline graph based on the input convolution feature graph. The text centerline graph is a single-channel segmentation graph after zooming the text area, and may predict whether each pixel belongs to text or non-text. The first branch convolutional network may be based on a truth value (which may be obtained based on a zoomed and labeled box) labeled in training sample of the first branch convolutional network and a prediction value obtained by inputting the training sample of the first branch convolutional network into the first branch convolutional network, to determine the Dice coefficient loss function (Dice-loss) of the first branch convolutional network, and the Dice coefficient loss function is used to supervise the first branch convolutional network to learn the training sample.

The second branch convolutional network is used to output the text boundary offset graph based on the input convolution feature graph. The text boundary offset graph has four channels, indicating a coordinate offset of the points on the upper and lower borders of the text relative to the points on the center line. The second branch convolutional network may be based on a truth value labeled in training sample of the second branch convolutional network and a prediction value obtained by inputting the training sample of the second branch convolutional network into the second branch convolutional network, to determine the smooth L1 loss function of the second branch convolutional network, and the smooth L1 loss function of the second branch convolutional network is used to supervise the second branch convolutional network to learn the training sample.

The third branch convolutional network is used to output the text direction offset graph based on the input convolution feature graph. The text direction offset graph has two channels, indicating a coordinate offset of a point on the center line relative to a next point in the text reading direction. The third branch convolutional network may be based on a truth value labeled in training sample of the third branch convolutional network and a prediction value obtained by inputting the training sample of the third branch convolutional network into the third branch convolutional network, to determine the smooth L1 loss function of the third branch convolutional network, and the smooth L1 loss function of the third branch convolutional network is used to supervise the third branch convolutional network to learn the training sample.

The fourth branch convolutional network is used to output the text character classification graph based on the input convolution feature graph. The text character classification graph has (C+1) channels. The fourth branch convolutional network gathers points based on a true value of the text centerline, C is the number of text types to be recognized, and 1 is the number of background types. These feature graphs represent a probability that the point belongs to a certain text category. The fourth branch convolutional network may be based on a truth value labeled in training sample of the fourth branch convolutional network and a prediction value obtained by inputting the training sample of the fourth branch convolutional network into the fourth branch convolutional network, to determine the point collection-connectionist temporal classification loss function, and the point collection-connectionist temporal classification loss function is used to supervise the fourth branch convolutional network to learn the training sample.

Here, the point collection operation uses coordinates of a point sequence and the feature graph as input, and by sampling the coordinate position of each point in the point sequence on the feature graph, a sequence feature of the point sequence at the corresponding position of the feature graph is obtained. This operation is simple and efficient, supported by all mainstream deep learning frameworks, and may replace computationally intensive operations such as NMS and region of interest extraction in traditional end-to-end methods.

In addition, the PG-CTC loss function may acquire a classification result of feature points sequence of each text area through the point collection operation, compare the result with the labeled sequence, and then supervise and train the point sequence through the standard CTC loss. The use of this loss function may realize pixel-level recognition without any character-level labeling, which reduces a labeling cost and model complexity.

The multi-branch convolutional network in this implementation uses multi-branch to output in parallel, which may simplify the calculation process of the network and improve the calculation efficiency of the network. In addition, in some examples, the third branch convolutional network supervised for learning using the smooth L1 loss function may output the text direction offset graph, so that the third branch convolutional network uses direction branch prediction in subsequent processing to process various text reading directions, so as to deal with text recognition in any direction. In addition, point collection is used in the fourth branch convolutional network to extract the sequence feature without complicated operations, which may simplify the calculation process of the multi-branch convolutional network and improve the calculation efficiency of the multi-branch convolutional network. The point collection-connectionist temporal classification loss function is used to supervise the learning of the fourth branch convolutional network, which eliminates the need for character-level labeling, improves the efficiency of training the fourth branch convolutional network, and improves the efficiency and accuracy of the text character classification graph.

In some alternative implementations of the above embodiment, the method for recognizing a text may comprise:

the extracting coordinates of feature points of a character center from the text centerline graph, may comprise: extracting the coordinates of the feature points of the character center from the text centerline graph using a pre-trained extraction module; and/or the sorting the extracted coordinates of the feature points of the character center based on the text direction offset graph to obtain a coordinate sequence of the feature points of the character center, may comprise: sorting the extracted coordinates of the feature points of the character center based on the text direction offset graph to obtain the coordinate sequence of the feature points of the character center, using a pre-trained sorting module; and/or the determining a polygonal bounding box of the text area based on the coordinate sequence of the feature points of the character center and the text boundary offset graph, comprises: determining the polygonal bounding box of the text area based on the coordinate sequence of the feature points of the character center from the text boundary offset graph, using a bounding box picking module; and/or the determining a classification result of the feature points of the character center, based on the coordinate sequence of the feature points of the character center and the text character classification graph, comprises: determining the classification result of the feature points of the character center, based on the coordinate sequence of the feature points of the character center from the text character classification graph, using a character classification module.

In this implementation, by using the pre-trained extraction module to extract the coordinates of the feature points of the character center from the text centerline graph, the efficiency of extracting the feature points may be improved.

Alternatively or additionally, by using the pre-trained sorting module, based on the text direction offset graph, to determine the text reading direction, and then sort the coordinates of the feature points of the character center based on the text reading direction to obtain the coordinate sequence of the feature points of the character center, the efficiency of sorting the extracted coordinates of the feature points of the character center and obtaining the coordinate sequence may be improved.

Alternatively or additionally, by using the bounding box picking module, based on the coordinate sequence of the feature points of the character center, the polygonal bounding box of the text area corresponding to the coordinate sequence of the feature points of the character center is determined from the text boundary offset graph, thereby improving the picking efficiency of the bounding box.

Alternatively or additionally, by using the character classification module, based on the coordinate sequence of the feature points of the character center, the classification result of the feature points of the character center is determined from the text character classification graph, so as to quickly and accurately classify a character.

It may be understood that the above extraction module, sorting module, bounding box picking module and character classification module may be respectively implemented using a model based on convolutional neural networks (CNN), and detailed description thereof will be omitted.

Figure 3:
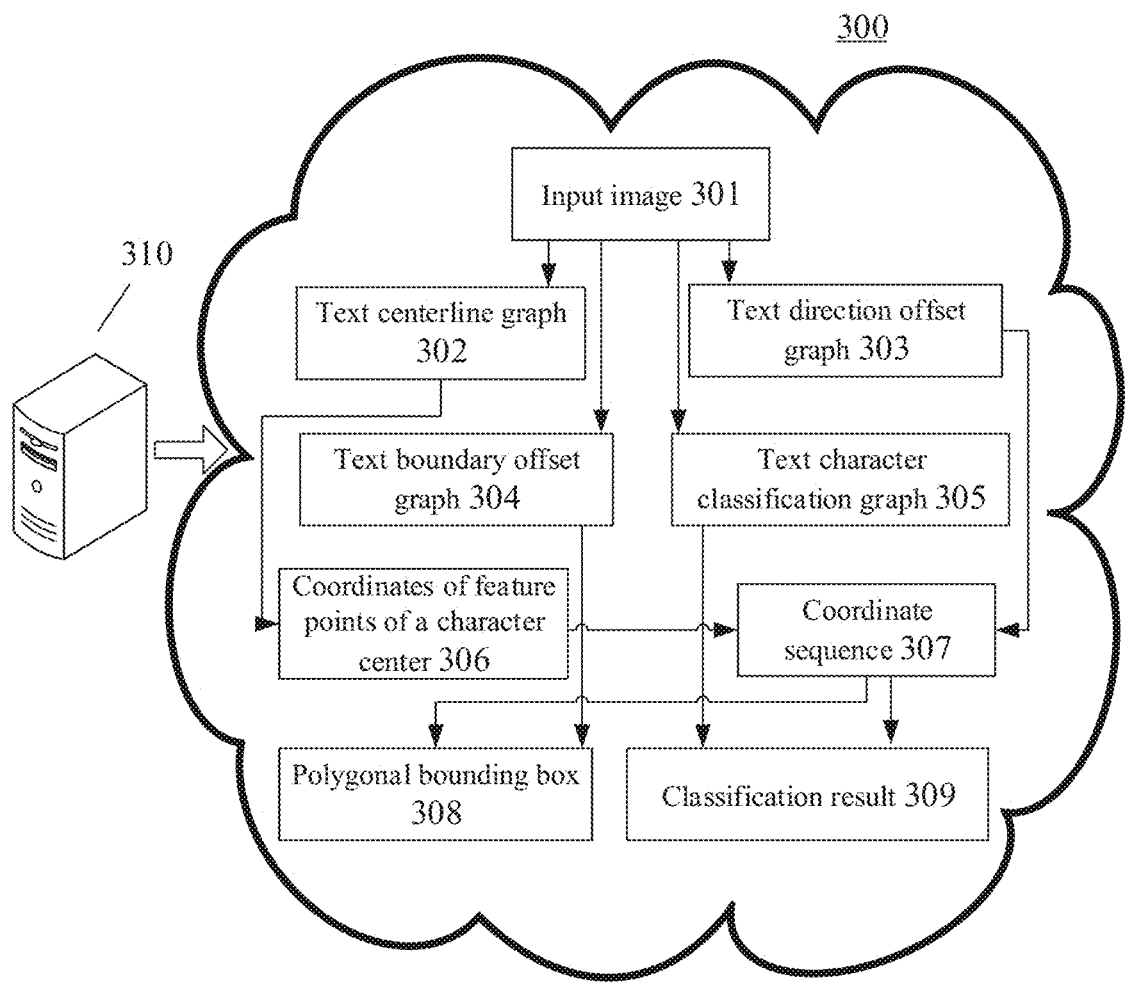
FIG. 3 is an example application scenario of the method for recognizing a text according to an embodiment of the present disclosure.

The following describes an example application scenario of the method for recognizing a text of the present disclosure with reference to FIG. 3.

As shown in FIG. 3, FIG. 3 shows an example application scenario of the method for recognizing a text according to the present disclosure.

As shown in FIG. 3, the method 300 for recognizing a text operates in an electronic device 310, and may comprise:

first, acquiring images of a text area of an input image 301 as follows: a text centerline graph 302, a text direction offset graph 303, a text boundary offset graph 304, and a text character classification graph 305;

then, extracting coordinates 306 of feature points of a character center from the text centerline graph 302;

then, sorting the extracted coordinates 306 of the feature points of the character center based on the text direction offset graph 303 to obtain a coordinate sequence 307 of the feature points of the character center;

then, determining a polygonal bounding box 308 of the text area based on the coordinate sequence 307 of the feature points of the character center and the text boundary offset graph 304; and finally, determining a classification result 309 of the feature points of the character center, based on the coordinate sequence 307 of the feature points of the character center and the text character classification graph 305.

It should be understood that the above application scenario of the method for recognizing a text shown in FIG. 3 is only an exemplary description of the method for recognizing a text, and does not represent a limitation on the method. For example, the steps shown in FIG. 3 may be further implemented with more detailed implementation methods. It is also possible to further add a step of further processing the determined classification result of the feature points of the character center on the basis of the above FIG. 3.

Figure 4A:
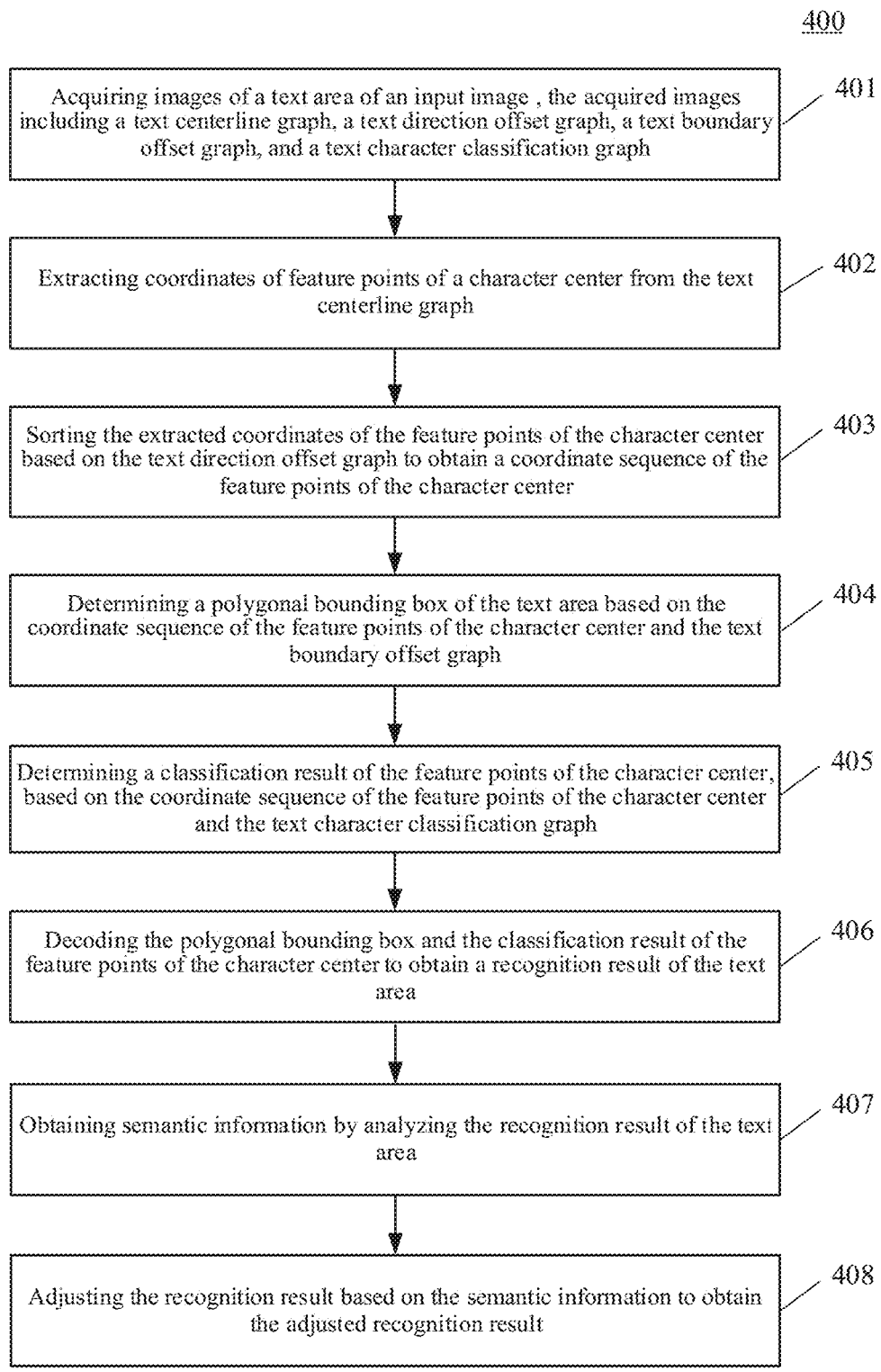
FIG. 4a is a schematic flowchart of another embodiment of the method for recognizing a text according to an embodiment of the present disclosure.

With further reference to FIG. 4a, FIG. 4a shows a schematic flowchart of an embodiment of the method for recognizing a text according to an embodiment of the present disclosure.

As shown in FIG. 4a, the method 400 in the schematic flowchart of another embodiment of the method for recognizing a text in an embodiment of the present disclosure may comprise:

Step 401, acquiring images of a text area of an input image, the acquired images including a text centerline graph, a text direction offset graph, a text boundary offset graph, and a text character classification graph.

In the present embodiment, an executing body of the method for recognizing a text (for example, the terminal or server shown in FIG. 1) may acquire the input image from a user's terminal, a local database or a remote database. Then, methods for determining a text centerline, a text direction offset, a text boundary offset, and a text character classification in the existing technology or technologies developed in the future may be used to determine the text centerline graph, the text direction offset graph, the text boundary offset graph, and the text character classification graph of the text area, respectively, which is not limited in the present disclosure.

S402, extracting coordinates of feature points of a character center from the text centerline graph.

In the present embodiment, the executing body may extract the coordinates of the feature points of the character center from the text centerline graph using a method for extracting coordinates of feature points in the existing technology or technologies developed in the future, which is not limited in the present disclosure.

Step 403, sorting the extracted coordinates of the feature points of the character center based on the text direction offset graph to obtain a coordinate sequence of the feature points of the character center.

In the present embodiment, the executing body may sort the coordinates of the feature points of the character center, based on a preset reading direction, a selected reading direction or a predicted reading direction of the text direction offset graph, thereby obtained the sorted coordinates of the feature points of the character center, that is, obtaining the coordinate sequence of the feature points of the character center.

Step 404, determining a polygonal bounding box of the text area based on the coordinate sequence of the feature points of the character center and the text boundary offset graph.

In the present embodiment, the executing body may obtain positions of a pair of points on the upper and lower borders based on the coordinate sequence of the feature points of the character center from the text boundary offset graph, and then connect positions of all the points on the upper and lower borders to obtain an arbitrary shape polygonal bounding box of the text area.

Step 405, determining a classification result of the feature points of the character center, based on the coordinate sequence of the feature points of the character center and the text character classification graph.

In the present embodiment, the executing body may perform point collection in the text character classification graph based on the coordinate sequence of the feature points of the character center, so as to determine a character classification category to which the feature points of the character center belongs, that is, obtain the classification result of the feature points of the character center.

Step 406, decoding the polygonal bounding box and the classification result of the feature points of the character center to obtain a recognition result of the text area.

In the present embodiment, the executing body may decode a recognition result of each character in the text area, based on the polygonal bounding box and the classification result of the feature points of the character center. When decoding, decoding methods in the existing technology or technologies developed in the future may be used to obtain the recognition result of each character, which is not limited in the present disclosure.

It may be understood that the above steps 401 to 406 correspond to steps 201 to 206 in the embodiment shown in FIG. 2 respectively. Therefore, the operations and features described above for steps 201 to 206 are also applicable to steps 401 to 406, and detailed description thereof will be omitted.

Step 407, obtaining semantic information by analyzing the recognition result of the text area.

In the present embodiment, the executing body may analyze based on the recognition result of the text area and a semantic relationship between characters and words, so as to obtain the semantic information in the recognition result of the text area.

In an alternative implementation of the present embodiment, the obtaining semantic information by analyzing the recognition result of the text area, comprises: performing point collection from the text character classification graph based on the coordinate sequence of the feature points of the character center, to obtain a semantic feature points of the feature points of the character center; and constructing a semantic graph using the semantic feature points as a semantic node, and using a semantic adjacency relationship between the semantic feature points determined based on a distance between the semantic feature points as an edge connection.

In this implementation, the executing body may gather points corresponding to the coordinate sequence of the feature points of the character center from the text character classification graph that reflects the semantics of the text area, thereby obtaining the semantic feature points of the feature points of the character center. Then, the semantic feature points may be used as the semantic node, and the semantic adjacency relationship may be used as the edge connection to construct the semantic graph representing the semantic information.

In this implementation, the method for obtaining semantic information by analyzing the recognition result of the text area, uses the semantic graph as a carrier of the semantic information, which may reveal semantic laws of the text area intuitively and effectively, thereby improving the validity of a analyzed result.

Step 408, adjusting the recognition result based on the semantic information to obtain the adjusted recognition result.

In the present embodiment, based on the semantic information determined in step 407, the executing body may compare the semantic information with semantic information in a preset semantic graph determined based on the semantic laws, and adjust the recognition result based on a similarity of a comparison result to obtain the adjusted more accurate recognition result.

Compared with the method for recognizing a text in FIG. 2, the method for recognizing a text provided in the present embodiment may adjust the recognition result in FIG. 2 based on the semantic information, so that more accurate adjusted recognition result may be obtained.

In an alternative implementation of the present embodiment, the adjusting the recognition result based on the semantic information to obtain the adjusted recognition result, comprises: performing point collection from the convolution feature graph based on the coordinate sequence of the feature points of the character center, to obtain a visual feature points of the feature points of the character center; constructing a visual graph using the visual feature points as a visual node, and using a visual adjacency relationship between the visual feature points determined based on a distance between the visual feature points as an edge connection; analyzing the semantic graph using a semantic graph network to obtain a semantic graph feature; analyzing the visual graph using a visual graph network to obtain a visual graph feature; fusing the semantic graph feature and the visual graph feature to obtain a fused feature; and classifying the fused feature to obtain the adjusted recognition result.

In this implementation, for a visual feature reflected in the convolution feature graph, point collection may be performed therefrom based on the coordinate sequence of the feature points of the character center, to obtain the visual feature points corresponding to the coordinate sequence of the feature points of the character centerline. Then, the visual feature points is used as the visual node and the visual adjacency relationship is used as the edge connection to construct the visual graph.

Then, for the semantic graph and the visual graph, the semantic graph network and the visual graph network may be used for analyzing respectively to obtain the semantic graph feature and the visual graph feature, and these two features are fused, so as to classify the fused feature to obtain the adjusted recognition result.

Graph Network (GN) is a collection of functions organized in a graph structure to perform relational reasoning in a topological space. After using the semantic graph network and the visual graph network for analyzing to obtain the semantic graph feature and the visual graph feature, the semantic graph feature and the visual graph feature may be fused.

When fusing the semantic graph feature and the visual graph feature, fusion methods in the existing technology or technologies developed in the future may be used, which is not limited in the present disclosure. For example, the semantic graph feature and the visual graph feature may be combined serially or in parallel to obtain the fused feature; each dimension of the fused feature is selected to select data that is optimal for classification, and the selected data is formed into a new feature; or a mathematical method is used to perform feature transformation on the semantic graph feature and the visual graph feature to obtain the fused feature.

In this implementation, by constructing the visual graph and fusing the semantic graph feature and the visual graph feature, the fused feature is obtained, and then classification is performed based on the fused feature to obtain the adjusted recognition result. In this process, because the semantic graph network and the visual graph network are used for analyzing, the efficiency and accuracy of the analyzed result may be improved. In addition, the fused feature may be classified to obtain the more accurate recognition result.

In some alternative implementations of the present embodiment, the semantic graph network and the visual graph network respectively use a connectionist temporal classification loss function for supervising and learning of training samples in a training phase.

In this implementation, the connectionist temporal classification (CTC) loss function (essentially a loss function based on the maximum likelihood) is used to train the semantic graph network and the visual graph network. There is no need to align and label the data one by one, and CTC directly outputs a probability of sequence prediction, no external post-processing is required, which may reduce the cost of labeling and calculation, and improve the efficiency and accuracy of training the semantic graph network and the visual graph network.

Figure 4B:
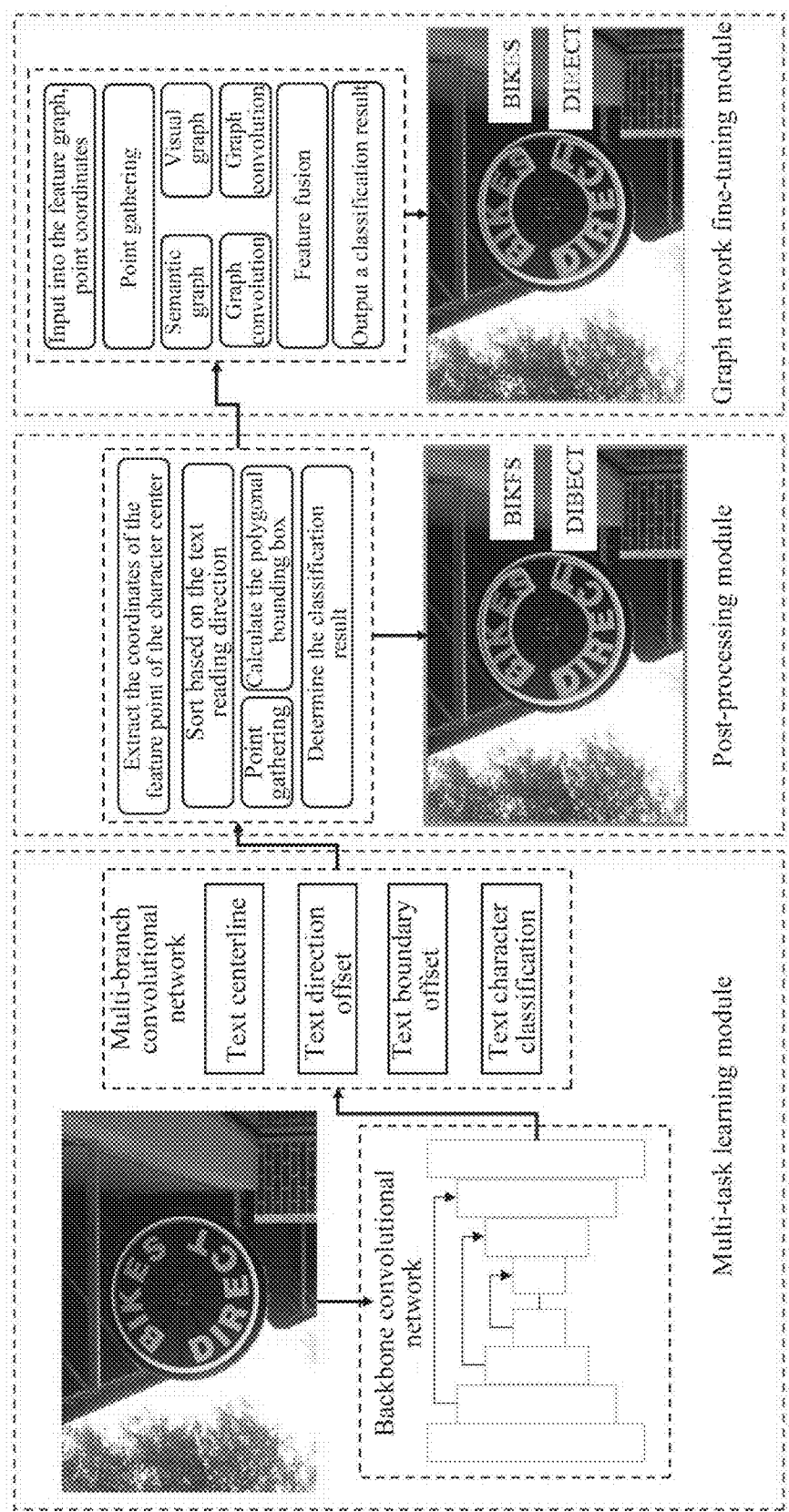

With further reference to FIG. 4b, FIG. 4b shows an example application scenario of the method for recognizing a text according to the embodiment of the present disclosure in FIG. 4a.

As shown in FIG. 4b, the method for recognizing a text is implemented by a network model comprising a multi-task learning module, a post-processing module and a graph network fine-tuning module. The multi-task learning module comprises: a backbone convolutional network and a multi-branch convolutional network. Based on the three modules, the method for recognizing a text comprises:

first, the multi-task learning module uses the backbone convolutional network to acquire the input image and output the convolution feature graph;

then, the multi-task learning module uses the multi-branch convolutional network to output the images of the text area as follows based on the input convolution feature graph: the text centerline graph, the text direction offset graph, the text boundary offset graph, and the text character classification graph;

then, the post-processing module extracts the coordinates of the feature points of the character center from the text centerline graph; determines the text reading direction based on the text direction offset graph; then sorts the coordinates of the feature points of the character center based on the text reading direction to obtain the coordinate sequence of the feature points of the character center; and performs point collection from the text boundary offset graph based on the coordinate sequence of the feature points of the character center, and calculates the polygonal bounding box of the text area (such as the bounding box of the enclosed text BIKES and the bounding box of the enclosed text DIRECT in the figure), performs point collection from the text character classification graph to determine the classification result of the feature points of the character center (such as BIKFS, DIBECT as shown in the figure).

Then, the graph network fine-tuning module performs point collection from the text character classification graph input into the feature graph based on the coordinate sequence (point coordinates in the figure) of the feature points of the character center, to obtain the semantic feature points of the feature points of the character center; then constructs the semantic graph using the semantic feature points as the semantic node, and using the semantic adjacency relationship between the semantic feature points determined based on the distance between the semantic feature points as the edge connection; performs point collection from the convolution feature graph based on the coordinate sequence of the feature points of the character center, to obtain the visual feature points of the feature points of the character center; and constructs the visual graph using the visual feature points as the visual node, and using the visual adjacency relationship between the visual feature points determined based on the distance between the visual feature points as the edge connection.

Then, the graph network fine-tuning module analyzes the semantic graph (that is, performing graph convolution) using the semantic graph network to obtain the semantic graph feature; analyzes the visual graph (that is, performing graph convolution) using the visual graph network to obtain the visual graph feature; then performs feature fusion on the semantic graph feature and the visual graph feature to obtain the fused feature; and finally classifies the fused feature and outputs a classification result, that is, obtains the adjusted recognition result (such as BIKES and DIRECT in the recognition result box presented by the graph network fine-tuning module in the figure).

Figure 5:
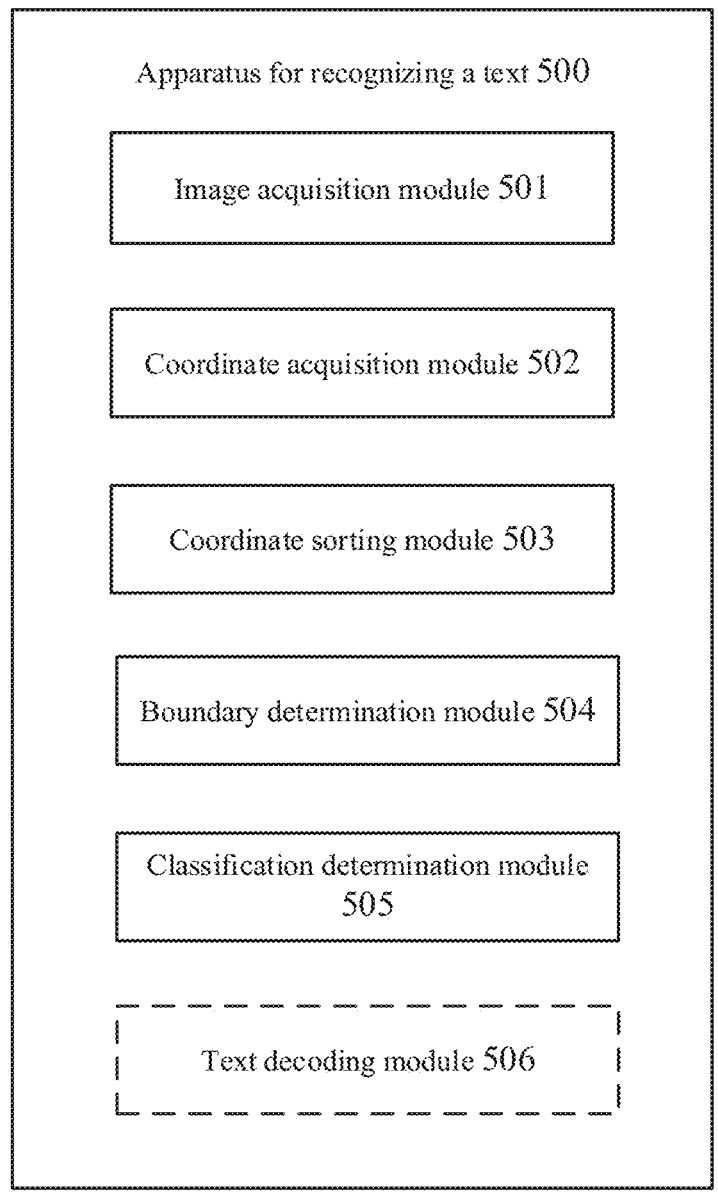
FIG. 5 is an example structural diagram of an embodiment of an apparatus for recognizing a text according to an embodiment of the present disclosure.

With further reference to FIG. 5, an apparatus 500 for recognizing a text of the present embodiment, may comprise: an image acquisition module 501, configured to acquire images of a text area of an input image, the acquired images including a text centerline graph, a text direction offset graph, a text boundary offset graph, and a text character classification graph; a coordinate acquisition module 502, configured to extract coordinates of feature points of a character center from the text centerline graph; a coordinate sorting module 503, configured to sort the coordinates of the feature points of the character center based on the text direction offset graph to obtain a coordinate sequence of the feature points of the character center; a boundary determination module 504, configured to determine a polygonal bounding box of the text area based on the coordinate sequence of the feature points of the character center and the text boundary offset graph; and a classification determination module 505, configured to determine a classification result of the feature points of the character center, based on the coordinate sequence of the feature points of the character center and the text character classification graph.

In some alternative implementations of the present embodiment, the coordinate sorting module 503 comprises (not shown in the figure): a direction calculation module, configured to calculate a text reading direction based on the text direction offset graph; and a sequence obtaining module, configured to sort the coordinates of the feature points of the character center based on the text reading direction, to obtain the coordinate sequence of the feature points of the character center.

In some alternative implementations of the present embodiment, the apparatus further comprises: a text decoding module 506, configured to decode the polygonal bounding box and the classification result of the feature points of the character center to obtain a recognition result of the text area.

In some alternative implementations of the present embodiment, the image acquisition module 501 comprises (not shown in the figure): a backbone convolutional module, configured to acquire a convolution feature graph of the input image using a backbone convolutional network; and a feature extraction module, configured to extract the text centerline graph, the text direction offset graph, the text boundary offset graph, and the text character classification graph from the convolution feature graph respectively using a multi-branch convolutional network.

In some alternative implementations of the present embodiment, the multi-branch convolutional network in the feature extraction module comprises at least one of: supervising and learning a first branch convolutional network based on a Dice coefficient loss function, wherein the convolution feature graph and the text centerline graph are an input to the first branch convolutional network and an output from the first branch convolutional network, respectively; supervising and learning a second branch convolutional network based on a smooth L1 loss function, wherein the convolution feature graph and the text boundary offset graph are an input to the second branch convolutional network and an output from the second branch convolutional network, respectively; supervising and learning a third branch convolutional network based on the smooth L1 loss function, wherein the convolution feature graph and the text direction offset graph are an input to the third branch convolutional network and an output from the third branch convolutional network, respectively; and supervising and learning a fourth branch convolutional network based on a point collection-connectionist temporal classification loss function, wherein the convolution feature graph and the text character classification graph are an input to the fourth branch convolutional network and an output from the fourth branch convolutional network, respectively.

In some alternative implementations of the present embodiment, the apparatus further comprises: the coordinate acquisition module 502 is further configured to: extract the coordinates of the feature points of the character center from the text centerline graph using a pre-trained extraction module; and/or the coordinate sorting module 503 is further configured to: sort the coordinates of the feature points of the character center based on the text direction offset graph to obtain the coordinate sequence of the feature points of the character center, using a pre-trained sorting module; and/or the boundary determination module 504 is further configured to: determine the polygonal bounding box of the text area based on the coordinate sequence of the feature points of the character center from the text boundary offset graph, using a bounding box picking module; and/or the classification determination module 505 is further configured to: determine the classification result of the feature points of the character center, based on the coordinate sequence of the feature points of the character center from the text character classification graph, using a character classification module.

In some alternative implementations of the present embodiment, the apparatus further comprises (not shown in the figure): a semantic analyzing module, configured to obtain semantic information by analyzing the recognition result of the text area; and a result adjusting module, configured to adjust the recognition result based on the semantic information to obtain the adjusted recognition result.

In some alternative implementations of the present embodiment, the semantic analyzing module comprises: a semantic point collection module, configured to perform point collection from the text character classification graph based on the coordinate sequence of the feature points of the character center, to obtain a semantic feature points of the feature points of the character center; and a semantic graph construction module, configured to construct a semantic graph using the semantic feature points as a semantic node, and using a semantic adjacency relationship between the semantic feature points determined based on a distance between the semantic feature points as an edge connection.

In some alternative implementations of the present embodiment, the result adjusting module comprises: a visual point collection module, configured to perform point collection from the convolution feature graph based on the coordinate sequence of the feature points of the character center, to obtain a visual feature points of the feature points of the character center; a visual graph construction module, configured to construct a visual graph using the visual feature points as a visual node, and using a visual adjacency relationship between the visual feature points determined based on a distance between the visual feature points as an edge connection; a semantic graph analyzing module, configured to analyze the semantic graph using a semantic graph network to obtain a semantic graph feature; a visual graph analyzing module, configured to analyze the visual graph using a visual graph network to obtain a visual graph feature; a feature fusion module, configured to fuse the semantic graph feature and the visual graph feature to obtain a fused feature; and a feature classification module, configured to classify the fused feature to obtain the adjusted recognition result.

In some alternative implementations of the present embodiment, the semantic graph network in the semantic graph analyzing module and the visual graph network in the visual graph analyzing module respectively use a connectionist temporal classification loss function for supervising and learning of training samples in a training phase.

It should be understood that the modules recorded in the apparatus 500 correspond to the steps recorded in the method described with reference to FIGS. 2 to 4*b*. Therefore, the operations and features described above for the method are also applicable to the apparatus 500 and the modules contained therein, and detailed description thereof will be omitted.

Figure 6:
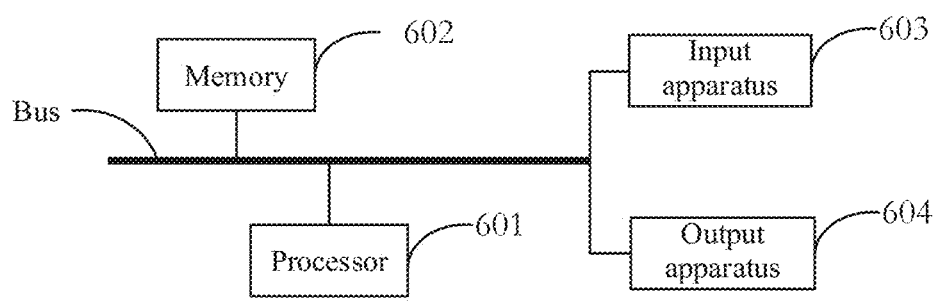
FIG. 6 is a block diagram of an electronic device used to implement the method for recognizing a text in an embodiment of the present disclosure according to the present disclosure.

As shown in FIG. 6, which is a block diagram of an electronic device of a method for recognizing a text according to an embodiment of the present disclosure. The electronic device is intended to represent various forms of digital computers, such as laptop computers, desktop computers, workbenches, personal digital assistants, servers, blade servers, mainframe computers, and other suitable computers. The electronic device may also represent various forms of mobile apparatuses, such as personal digital processing, cellular phones, smart phones, wearable devices, and other similar computing apparatuses. The components shown herein, their connections and relationships, and their functions are merely examples, and are not intended to limit the implementation of the present disclosure described and/or claimed herein.

As shown in FIG. 6, the electronic device comprises: one or more processors 601, a memory 602, and interfaces for connecting various components, comprising high-speed interfaces and low-speed interfaces. The various components are connected to each other using different buses, and may be installed on a common motherboard or in other methods as needed. The processor may process instructions executed within the electronic device, comprising instructions stored in or on the memory to display graphic information of GUI on an external input/output apparatus (such as a display device coupled to the interface). In other embodiments, a plurality of processors and/or a plurality of buses may be used together with a plurality of memories if desired. Similarly, a plurality of electronic devices may be connected, and the devices provide some necessary operations (for example, as a server array, a set of blade servers, or a multi-processor system). In FIG. 6, one processor 601 is used as an example.

The memory 602 is a non-transitory computer readable storage medium provided by the present disclosure. The memory stores instructions executable by at least one processor, so that the at least one processor performs the method for recognizing a text provided by the present disclosure. The non-transitory computer readable storage medium of the present disclosure stores computer instructions for causing a computer to perform the method for recognizing a text provided by the present disclosure.

The memory 602, as a non-transitory computer readable storage medium, may be used to store non-transitory software programs, non-transitory computer executable programs and modules, such as program instructions/modules corresponding to the method for recognizing a text in the embodiments of the present disclosure (for example, the image acquisition module 501, the coordinate acquisition module 502, the coordinate sorting module 503, boundary determination module 504, and the classification determination module 505 shown in FIG. 5). The processor 601 executes the non-transitory software programs, instructions, and modules stored in the memory 602 to execute various functional applications and data processing of the server, that is, to implement the method for recognizing a text in the foregoing method embodiment.

The memory 602 may comprise a storage program area and a storage data area, where the storage program area may store an operating system and at least one function required application program; and the storage data area may store data created by the use of the electronic device according to the method for recognizing a text, etc. In addition, the memory 602 may comprise a high-speed random access memory, and may also comprise a non-transitory memory, such as at least one magnetic disk storage device, a flash memory device, or other non-transitory solid-state storage devices. In some embodiments, the memory 602 may optionally comprise memories remotely provided with respect to the processor 601, and these remote memories may be connected to the electronic device of the method for recognizing a text through a network. Examples of the above network comprise but are not limited to the Internet, intranet, local area network, mobile communication network, and combinations thereof.

The electronic device of the method for recognizing a text may further comprise: an input apparatus 603 and an output apparatus 604. The processor 601, the memory 602, the input apparatus 603, and the output apparatus 604 may be connected through a bus or in other methods. In FIG. 6, connection through a bus is used as an example.

The input apparatus 603 may receive input digital or character information, and generate key signal inputs related to user settings and function control of the electronic device of the method for recognizing a text, such as touch screen, keypad, mouse, trackpad, touchpad, pointing stick, one or more mouse buttons, trackball, joystick and other input apparatuses. The output apparatus 604 may comprise a display device, an auxiliary lighting apparatus (for example, LED), a tactile feedback apparatus (for example, a vibration motor), and the like. The display device may comprise, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, dedicated ASICs (application specific integrated circuits), computer hardware, firmware, software, and/or combinations thereof. These various embodiments may comprise: being implemented in one or more computer programs that may be executed and/or interpreted on a programmable system that comprises at least one programmable processor. The programmable processor may be a dedicated or general-purpose programmable processor, and may receive data and instructions from a storage system, at least one input apparatus, and at least one output apparatus, and transmit the data and instructions to the storage system, the at least one input apparatus, and the at least one output apparatus.

These computing programs (also referred to as programs, software, software applications, or codes) comprise machine instructions of the programmable processor and may use high-level processes and/or object-oriented programming languages, and/or assembly/machine languages to implement these computing programs. As used herein, the terms "machine readable medium" and "computer readable medium" refer to any computer program product, device, and/or apparatus (for example, magnetic disk, optical disk, memory, programmable logic apparatus (PLD)) used to provide machine instructions and/or data to the programmable processor, comprising machine readable medium that receives machine instructions as machine readable signals. The term "machine readable signal" refers to any signal used to provide machine instructions and/or data to the programmable processor.

In order to provide interaction with a user, the systems and technologies described herein may be implemented on a computer, the computer has: a display apparatus for displaying information to the user (for example, CRT (cathode ray tube) or LCD (liquid crystal display) monitor); and a keyboard and a pointing apparatus (for example, mouse or trackball), and the user may use the keyboard and the pointing apparatus to provide input to the computer. Other types of apparatuses may also be used to provide interaction with the user; for example, feedback provided to the user may be any form of sensory feedback (for example, visual feedback, auditory feedback, or tactile feedback); and any form (comprising acoustic input, voice input, or tactile input) may be used to receive input from the user.

The systems and technologies described herein may be implemented in a computing system that comprises backend components (e.g., as a data server), or a computing system that comprises middleware components (e.g., application server), or a computing system that comprises frontend components (for example, a user computer having a graphical user interface or a web browser, through which the user may interact with the implementations of the systems and the technologies described herein), or a computing system that comprises any combination of such backend components, middleware components, or frontend components. The components of the system may be interconnected by any form or medium of digital data communication (e.g., communication network). Examples of the communication network comprise: local area networks (LAN), wide area networks (WAN), and the Internet.

The computer system may comprise a client and a server. The client and the server are generally far from each other and usually interact through the communication network. The relationship between the client and the server is generated by computer programs that run on the corresponding computer and have a client-server relationship with each other. The server may be a cloud server, also known as a cloud computing server or a cloud host. The server is a host product in the cloud computing service system to solve the defects of management difficulty in traditional physical host and virtual private server (VPS) services Large, and weak business scalability.

According to the technical solution of the embodiments of the present disclosure, the coordinates of the feature points of the character center and the text direction offset may be used for recognition. The solution may recognize text in any direction in the input image, and improve the efficiency and accuracy of text recognition.

It should be understood that the various forms of processes shown above may be used to reorder, add, or delete steps. For example, the steps described in the present disclosure may be performed in parallel, sequentially, or in different orders. As long as the desired results of the technical solution disclosed in the present disclosure may be achieved, no limitation is made herein.

The above specific embodiments do not constitute limitation on the protection scope of the present disclosure. Those skilled in the art should understand that various modifications, combinations, sub-combinations and substitutions may be made according to design requirements and other factors. Any modification, equivalent replacement and improvement made within the spirit and principle of the present disclosure shall be comprised in the protection scope of the present disclosure.

What is claimed is:

1. A method for recognizing a text, the method comprising:
  acquiring images of a text area of an input image, the acquired images including a text centerline graph, a text direction offset graph, a text boundary offset graph, and a text character classification graph;
  extracting coordinates of feature points of a character center from the text centerline graph;
  sorting the extracted coordinates of the feature points of the character center based on the text direction offset graph to obtain a coordinate sequence of the feature points of the character center;
  determining a polygonal bounding box of the text area based on the coordinate sequence of the feature points of the character center and the text boundary offset graph; and determining a classification result of the feature points of the character center, based on the coordinate sequence of the feature points of the character center and the text character classification graph.

2. The method according to claim 1, wherein the sorting comprises:
calculating a text reading direction based on the text direction offset graph; and
sorting the extracted coordinates of the feature points of the character center based on the text reading direction to obtain the coordinate sequence of the feature points of the character center.

3. The method according to claim 1, wherein the method further comprises:
decoding the polygonal bounding box and the classification result of the feature points of the character center to obtain a recognition result of the text area.

4. The method according to claim 3, wherein the method further comprises:
obtaining semantic information by analyzing the recognition result of the text area; and
adjusting the recognition result based on the semantic information to obtain the adjusted recognition result.

5. The method according to claim 4, wherein the obtaining comprises:
performing point collection from the text character classification graph based on the coordinate sequence of the feature points of the character center, to obtain a semantic feature point of the feature points of the character center; and
constructing a semantic graph using the semantic feature points as a semantic node, and using a semantic adjacency relationship between the semantic feature points determined based on a distance between the semantic feature points as an edge connection.

6. The method according to claim 5, wherein the adjusting comprises:
performing point collection from a convolution feature graph based on the coordinate sequence of the feature points of the character center, to obtain visual feature points of the feature points of the character center;
constructing a visual graph using the visual feature points as a visual node, and using a visual adjacency relationship between the visual feature points determined based on a distance between the visual feature points as an edge connection;
analyzing the semantic graph using a semantic graph network to obtain a semantic graph feature;
analyzing the visual graph using a visual graph network to obtain a visual graph feature;
fusing the semantic graph feature and the visual graph feature to obtain a fused feature; and
classifying the fused feature to obtain the adjusted recognition result.

7. The method according to claim 6, wherein the semantic graph network and the visual graph network respectively use a connectionist temporal classification loss function for supervising and learning of training samples in a training phase.

8. The method according to claim 1, wherein the acquiring comprises:
acquiring a convolution feature graph of the input image using a backbone convolutional network; and
extracting the text centerline graph, the text direction offset graph, the text boundary offset graph, and the text character classification graph from the convolution feature graph respectively using a multi-branch convolutional network.

9. The method according to claim 8, wherein the multi-branch convolutional network comprises at least one of:
supervising and learning a first branch convolutional network based on a Dice coefficient loss function, wherein the convolution feature graph and the text centerline graph are an input to the first branch convolutional network and an output from the first branch convolutional network, respectively;
supervising and learning a second branch convolutional network based on a smooth L1 loss function, wherein the convolution feature graph and the text boundary offset graph are an input to the second branch convolutional network and an output from the second branch convolutional network, respectively;
supervising and learning a third branch convolutional network based on the smooth L1 loss function, wherein the convolution feature graph and the text direction offset graph are an input to the third branch convolutional network and an output from the third branch convolutional network, respectively; and
supervising and learning a fourth branch convolutional network based on a point collection-connectionist temporal classification loss function, wherein the convolution feature graph and the text character classification graph are an input to the fourth branch convolutional network and an output from the fourth branch convolutional network, respectively.

10. The method according to claim 1, wherein:
extracting the coordinates comprises:
extracting the coordinates of the feature points of the character center from the text centerline graph using a pre-trained extraction module, or
the sorting the extracted coordinates of the feature points of the character center based on the text direction offset graph comprises:
sorting the extracted coordinates of the feature points of the character center based on the text direction offset graph to obtain the coordinate sequence of the feature points of the character center, using a pre-trained sorting module, or
the determining a polygonal bounding box comprises:
determining the polygonal bounding box of the text area based on the coordinate sequence of the feature points of the character center from the text boundary offset graph, using a bounding box picking module; or
the determining the classification result comprises:
determining the classification result of the feature points of the character center, based on the coordinate sequence of the feature points of the character center from the text character classification graph, using a character classification module.

11. An electronic device, comprising:
at least one processor; and
a memory, communicatively connected to the at least one processor; wherein,
the memory, storing instructions executable by the at least one processor, the instructions, when executed by the at least one processor, cause the at least one processor to perform an operation for recognizing a text, comprising:
acquiring images of a text area of an input image, the acquired images including a text centerline graph, a text direction offset graph, a text boundary offset graph, and a text character classification graph;
extracting coordinates of feature points of a character center from the text centerline graph;
sorting the extracted coordinates of the feature points of the character center based on the text direction offset graph to obtain a coordinate sequence of the feature points of the character center;
determining a polygonal bounding box of the text area based on the coordinate sequence of the feature points of the character center and the text boundary offset graph; and
determining a classification result of the feature points of the character center, based on the coordinate sequence of the feature points of the character center and the text character classification graph.

12. A non-transitory computer readable storage medium, storing computer instructions, the computer instructions, being used to cause the computer to perform an operation for recognizing a text, comprising:
acquiring images of a text area of an input image, the acquired images including a text centerline graph, a text direction offset graph, a text boundary offset graph, and a text character classification graph;
extracting coordinates of feature points of a character center from the text centerline graph;
sorting the extracted coordinates of the feature points of the character center based on the text direction offset graph to obtain a coordinate sequence of the feature points of the character center;
determining a polygonal bounding box of the text area based on the coordinate sequence of the feature points of the character center and the text boundary offset graph; and
determining a classification result of the feature points of the character center, based on the coordinate sequence of the feature points of the character center and the text character classification graph.

13. The medium according to claim 12, wherein the sorting comprises:
calculating a text reading direction based on the text direction offset graph; and
sorting the extracted coordinates of the feature points of the character center based on the text reading direction to obtain the coordinate sequence of the feature points of the character center.

14. The medium according to claim 12, wherein the operation further comprises:
decoding the polygonal bounding box and the classification result of the feature points of the character center to obtain a recognition result of the text area.

15. The medium according to claim 14, wherein the operation further comprises:
obtaining semantic information by analyzing the recognition result of the text area; and
adjusting the recognition result based on the semantic information to obtain the adjusted recognition result.

16. The medium according to claim 15, wherein the obtaining comprises:
performing point collection from the text character classification graph based on the coordinate sequence of the feature points of the character center, to obtain a semantic feature point of the feature points of the character center; and
constructing a semantic graph using the semantic feature points as a semantic node, and using a semantic adjacency relationship between the semantic feature points determined based on a distance between the semantic feature points as an edge connection.

17. The medium according to claim 16, wherein the adjusting comprises:
performing point collection from a convolution feature graph based on the coordinate sequence of the feature points of the character center, to obtain visual feature points of the feature points of the character center;
constructing a visual graph using the visual feature points as a visual node, and using a visual adjacency relationship between the visual feature points determined based on a distance between the visual feature points as an edge connection;
analyzing the semantic graph using a semantic graph network to obtain a semantic graph feature;
analyzing the visual graph using a visual graph network to obtain a visual graph feature;
fusing the semantic graph feature and the visual graph feature to obtain a fused feature; and
classifying the fused feature to obtain the adjusted recognition result.

18. The medium according to claim 12, wherein the acquiring comprises:
acquiring a convolution feature graph of the input image using a backbone convolutional network; and
extracting the text centerline graph, the text direction offset graph, the text boundary offset graph, and the text character classification graph from the convolution feature graph respectively using a multi-branch convolutional network.

19. The medium according to claim 18, wherein the multi-branch convolutional network comprises at least one of:
supervising and learning a first branch convolutional network based on a Dice coefficient loss function, wherein the convolution feature graph and the text centerline graph are an input to the first branch convolutional network and an output from the first branch convolutional network, respectively;
supervising and learning a second branch convolutional network based on a smooth L1 loss function, wherein the convolution feature graph and the text boundary offset graph are an input to the second branch convolutional network and an output from the second branch convolutional network, respectively;
supervising and learning a third branch convolutional network based on the smooth L1 loss function, wherein the convolution feature graph and the text direction offset graph are an input to the third branch convolutional network and an output from the third branch convolutional network, respectively; and
supervising and learning a fourth branch convolutional network based on a point collection-connectionist temporal classification loss function, wherein the convolution feature graph and the text character classification graph are an input to the fourth branch convolutional network and an output from the fourth branch convolutional network, respectively.

20. The medium according to claim 12, wherein:
extracting coordinates comprises:
extracting the coordinates of the feature points of the character center from the text centerline graph using a pre-trained extraction module, or
the sorting the extracted coordinates of the feature points of the character center based on the text direction offset graph comprises:

sorting the extracted coordinates of the feature points of the character center based on the text direction offset graph to obtain the coordinate sequence of the feature points of the character center, using a pre-trained sorting module, or the determining the polygonal bounding box comprises:
determining the polygonal bounding box of the text area based on the coordinate sequence of the feature points of the character center from the text boundary offset graph, using a bounding box picking module, or the determining the classification result comprises:
determining the classification result of the feature points of the character center, based on the coordinate sequence of the feature points of the character center from the text character classification graph, using a character classification module.

* * * * *